Patented Oct. 6, 1953

2,654,781

UNITED STATES PATENT OFFICE 2,654,781

BIS(TETRAALKYLDIAMIDOPHOSPHORYL) ALKANEPHOSPHONATES

Henry Tolkmith, Midland, Mich., assignor to The Dow Chemical Company, Midland, Mich., a corporation of Delaware No Drawing. Application August 17, 1951, Serial No. 242,402

5 Claims. (Cl. 260—545)

The present invention is concerned with certain new and useful phosphate compounds and a novel method for the production of polyphosphate compounds.

The new compounds are bis(tetraalkyldiamidophosphoryl) alkanephosphonates of the formula

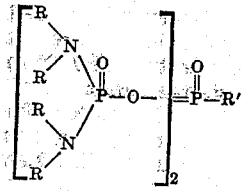

In this and succeeding formulae, each R represents an alkyl radical containing from 1 to 4 carbon atoms, inclusive, and R' represents an alkyl radical containing 1 or 2 carbon atoms. These triphosphates are viscous oils, somewhat soluble in many organic solvents and water. They are of particular value as toxic constituents of parasiticide compositions and as intermediates for the preparation of other phosphate derivatives.

The new compounds may be prepared by mixing or otherwise blending a compound of the formula

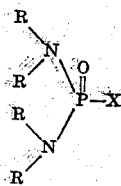

with a compound of the formula

wherein X is a member of the group consisting of chlorine and (R—O—) and Y is the other member of said group. The mixture is then heated at a temperature of from 90° to 135° C. whereby alkyl chloride is evolved (RCl); the heating being continued until the evolution of alkyl chloride of reaction is substantially complete.

Although the theory governing the reaction is not completely understood, it appears to involve a condensation resulting in the formation of alkyl chloride. In practice, substantially all the chlorine in the tetraalkyldiamidophosphoric chloride or the methanephosphonic dichloride may be recovered as alkyl chloride. The process might be represented as taking place according to either or both of the following equations:

(A)

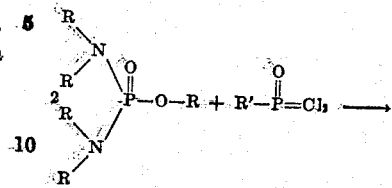

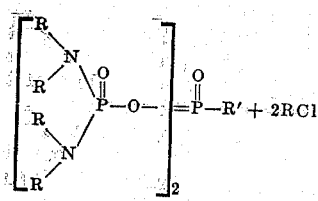

(B)

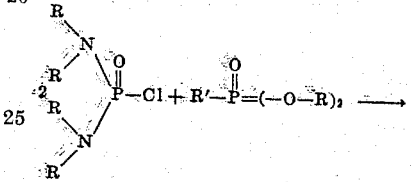

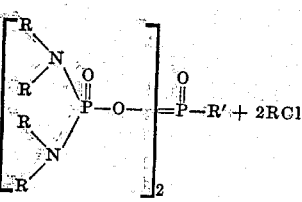

The proportion of at least 2 moles of the O-alkyl tetraalkyldiamidophosphate per mole of alkanephosphonic dichloride (as shown in Equation A) and the proportion of at least 2 moles of tetraalkyldiamidophosphoric chloride per mole of O,O-dialkyl alkanephosphonate (as shown in Equation B) is critical for the accomplishment of the desired reaction, i. e. the synthesis of the bis(tetraalkyldiamidophosphoryl) alkanephosphonates. If desired, a small excess of the O-alkyl tetraalkyldiamidophosphate or the tetraalkyldiamidophosphoric chloride may be employed, and a large excess does not affect the course of the reaction, but is undesirable from the standpoint of economy. A significantly lesser proportion is not desirable since it reduces the yield of the desired compound and results in the formation of other phosphate derivatives.

The reaction of the present invention proceeds smoothly at the temperature range of from 90° to 135° C. Since the desired products are somewhat unstable and have a tendency to rearrange into other phosphate materials at temperatures in excess of 135° C., exposure to such elevated temperatures for any appreciable period of time should be avoided.

The rate at which the reaction takes place has been found to vary directly with the temperature employed. In practice, the reaction is generally carried out over a period of from one to six hours or longer, extended periods being employed at the lower temperatures. In operating at a temperature of from 125°–135° C., the reaction is essentially complete in about 2 hours.

In carrying out the process of the present invention, the total reactant charge may be mechanically mixed and then heated for a period of time. Alternatively, either reactant may be added portionwise to the other under conditions of elevated temperature in the reaction vessel. In another procedure the reaction mixture may be heated at a temperature of 90° C. or somewhat higher for a time, and the temperature thereafter raised to from 125° to 135° C. for a short period to complete the reaction. If desired, the reaction may be carried out in an inert organic solvent such as toluene, xylene, and chlorobenzene.

The contacting of the reactants as above described may be carried out under any practical operating pressure. Since the alkyl chlorides produced in the process are frequently gases or low boiling liquids, operation under somewhat increased pressure is sometimes preferred in order to avoid the loss of the alkyl chloride by-products. However, where it may be desired to recover the by-products as produced, the operation may be carried out at atmospheric or reduced pressure; and such separation and recovery of alkyl chloride as formed, constitutes a preferred embodiment of the invention.

A potentially valuable mode of operation consists of carrying out the foregoing preparation as a continuous process. Thus, the reactants may be mixed or otherwise blended and metered through a suitable reaction zone of controlled temperature, at such a rate as to accomplish the formation of the desired compound in high yield during the reaction interval. In such operation, any suitable pressure and temperature may be maintained, and by-product alkyl chloride bled out of the system as desired.

Following the reaction, the mixture may be distilled under reduced pressure and under 135° C. to separate low boiling constituents and to obtain as a residue the desired bis(tetraalkyldiamidophosphoryl) alkanephosphonate product.

The following examples illustrate the invention but are not to be construed as limiting the same:

Example 1

30.6 grams (0.17 mole) of O-ethyl tetramethyldiamidophosphate (having a density of 1.0230 and a refractive index $n/D$ 1.4409 at 20° C.) and 11.3 grams (0.085 mole) of methanephosphoric dichloride were mixed together and the resulting dispersion heated with agitation at a temperature of from 95° to 100° C. until no further substantial amounts of ethyl chloride of reaction were liberated. During the heating, ethyl chloride was separated and recovered from the reaction zone as formed. A bis(tetramethyldiamidophosphoryl) methanephosphate product was thereby obtained in substantially quantitative yield as a yellow viscous oil having a refractive index $n/D$ of 1.4685 at 20° C.

Example 2

10.2 grams (0.04 mole) of N,N-dimethyl-N',N'-dibutyldiamidophosphoric chloride (having a density of 1.0420 and a refractive index $n/D$ of 1.4658 at 20° C.) and 2.5 grams (0.02 mole) of O,O-dimethyl methanephosphonate (having a density of 1.1639 and a refractive index $n/D$ of 1.4118 at 20° C.) were mixed together and the resulting dispersion heated at a temperature of 120° C. until the evolution of methyl chloride of reaction was substantially complete. The heating was carried out with stirring and over a period of about 2.5 hours. During the heating, methyl chloride was separated and recovered from the reaction zone as formed. A bis(N,N-dimethyl-N',N'-dibutyldiamidophosphoryl) methanephosphonate product was thereby obtained in substantially quantitative yield as a viscous oil having a refractive index $n/D$ of 1.4622 at 20° C.

Example 3

10 grams (0.0296 mole) of tetrabutyldiamidophosphoric chloride (having a density of 1.0257 and a refractive index $n/D$ of 1.4661 at 20° C.) and 2.04 grams (0.0148 mole) of O,O-dimethyl ethanephosphonate (having a density of 1.0418 and a refractive index $n/D$ of 1.4154 at 20° C.) were mixed together and the resulting dispersion heated at a temperature of 120° to 125° C. until no further substantial amounts of methyl chloride of reaction were liberated. The heating was carried out with stirring and over a period of about 2 hours. During the heating, gaseous methyl chloride was separated and recovered from the reaction zone as formed. A bis(tetrabutyldiamidophosphoryl) ethanephosphonate product was thereby obtained in substantially quantitative yield as a viscous oil having a refractive index $n/D$ of 1.4620 at 20° C. and a molecular weight of 718 as compared to a theoretical molecular weight of 714.

In a similar manner, other bis(tetraalkyldiamidophosphoryl) alkanephosphonates may be prepared as follows:

Bis-N-methyl-N-isopropyl-N'-methyl-N'-isopropyldiamidophosphoryl) methane phosphonate by reacting together O-methyl-N-methyl-N-isopropyl-N'-methyl-N'-isopropyldiamidophosphate and methanephosphonic dichloride.

Bis(tetraethyldiamidophosphoryl) ethanephosphonate by reacting together O-butyl tetraethyldiamidophosphate and ethanephosphonic dichloride.

Bis(N,N-dimethyl-N',N'-diisopropyldiamidophosphoryl) ethanephosphonate by reacting together N,N-dimethyl-N',N'-diisopropyldiamidophosphoric chloride and O,O-dibutyl ethanephosphonate.

Bis(N,N-dimethyl-N',N'-diethyldiamidophosphoryl) methanephosphonate by reacting together N,N-dimethyl-N',N'-diethyldiamidophosphoric chloride and O,O-diethyl methanephosphate.

Bis(N,N-diethyl-N',N'-dibutyldiamidophosphoryl) ethanephosphonate by reacting together O-propyl N,N-diethyl-N',N'-dibutyldiamidophosphate and ethanephosphonic dichloride.

The O-alkyl tetraalkyldiamidophosphates employed as starting materials, as above described, may be prepared by reacting a tetraalkyldiamidophosphoric chloride with a suitable sodium alcoholate. Satisfactory yields are obtained when employing one molecular proportion of the tetraalkyldiamidophosphoric chloride for each proportion of the alcoholate. The reaction takes place smoothly at the temperature range of from 30° to 90° C. The reaction is somewhat exothermic, the temperature being controlled by the addition and substraction of heat, if required. Following the reaction, the crude mixture may be filtered and the filtrate fractionally distilled under reduced pressure to separate the desired O-alkyl tetraalkyldiamidophosphate product.

The tetraalkyldiamidophosphoric chlorides employed in the preparation of the bis(tetraalkyldiamidophosphoryl) alkanephosphonates and the O-alkyl tetraalkyldiamidophosphates as previously described may be prepared by reacting phosphorus oxychloride (POCl₃) with at least one and no more than two amines of the formula

successively to displace two of the chlorines in the phosphorus oxychlorides with amido groups. In this formula R and R' represent the same or different alkyl radicals containing from 1 to 4 carbon atoms, inclusive. The reaction is carried out in a sufficient excess of the amine reactant to act as acceptor for by-product hydrogen chloride.

Where it is desired to introduce two identical amido groups into the molecule, 1 molecular proportion of the phosphorus oxychloride is reacted with 2 molecular proportions of the amine. Where it is desired that the substituting amido groups differ, 1 molecular proportion of the phosphorus oxychloride is successively reacted with one molecular proportion of each amine.

The reaction takes place smoothly at the temperature range of from 0° to 40° C. The reaction is somewhat exothermic and the temperature may be controlled by the addition and subtraction of heat, if required. Upon completion of the reaction, the crude mixture may be filtered and the filtrate fractionally distilled under reduced pressure to separate the desired product.

The alkanephosphoric dichlorides employed as starting materials in the present process may be prepared as reported in Beilstein, second edition, first supplement, volume 4, page 595. These materials have the following boiling points:

| Compound | Boiling Point |
| --- | --- |
| CH₃POCl₂ | 163° C. at 760 millimeters' pressure. |
| C₂H₅POCl₂ | 175° C. at 760 millimeters' pressure. |

The O,O-dialkyl alkane phosphonic dichlorides employed as starting materials may be prepared by reacting one molecular proportion of an alkanephosphonic dichloride with two molecular proportions of a suitable sodium alcoholate. The reaction is somewhat exothermic and takes place smoothly at the temperature range of from 20° to 80° C. The temperature may be controlled by the addition and subtraction of heat, if required. Following the reaction, the mixture may be filtered and the filtrate fractionally distilled under reduced pressure to separate the desired product.

I claim:
1. A bis(tetraalkyldiamidophosphoryl) alkanephosphonate of the formula

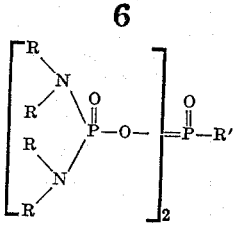

wherein each R represents an alkyl radical containing from 1 to 4 carbon atoms, inclusive, and R' represents a member of the group consisting of methyl and ethyl.

2. Bis(tetramethyldiamidophosphoryl) methanephosphonate having the formula

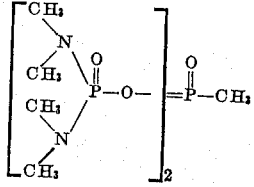

3. Bis(tetrabutyldiamidophosphoryl) ethanephosphonate having the formula

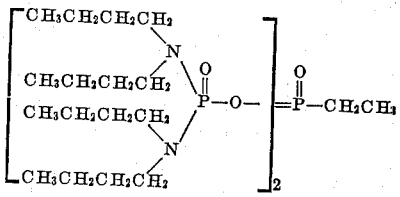

4. Bis(N,N - dimethyl - N',N' - dibutyldiamidophosphoryl) methanephosphonate having the formula

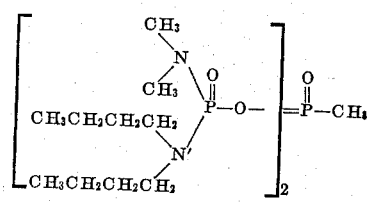

5. A method for producing polyphosphate compounds which comprises (1) admixing at least 2 molecular proportions of a compound of the formula

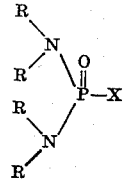

with one molecular proportion of a compound of the formula

in which formulae each R is an alkyl radical containing from 1 to 4 carbon atoms, inclusive, R' is an alkyl radical containing from 1 to 2 carbon atoms, inclusive, X is a member of the group consisting of chlorine and R—O— and Y is the other member of said group and (2) heating said mixture at a temperature of from 90° to 135° C. until the evolution of alkyl chloride of reaction is substantially complete.

HENRY TOLKMITH.

No references cited.